(No Model.)

A. BARKER.
SEED PLANTER.

No. 378,077. Patented Feb. 21, 1888.

WITNESSES
INVENTOR.
Amos Barker
By Myers & Co
Attorneys.

United States Patent Office.

AMOS BARKER, OF SPENCER, INDIANA.

SEED-PLANTER.

SPECIFICATION forming part of Letters Patent No. 378,077, dated February 21, 1888.

Application filed December 5, 1887. Serial No. 257,042. (No model.)

*To all whom it may concern:*

Be it known that I, AMOS BARKER, a citizen of the United States of America, residing at Spencer, in the county of Owen and State of Indiana, have invented certain new and useful Improvements in Seed-Planters, of which the following is a specification, reference being had therein to the accompanying drawings.

This invention pertains to certain new and useful improvements in seed-planters, having for its object the provision of simple and efficient means for equally and evenly distributing the seed; and it consists in the detail construction, combination, and arrangement of the parts, substantially as hereinafter fully set forth, and particularly pointed out in the claim.

Figure 1:
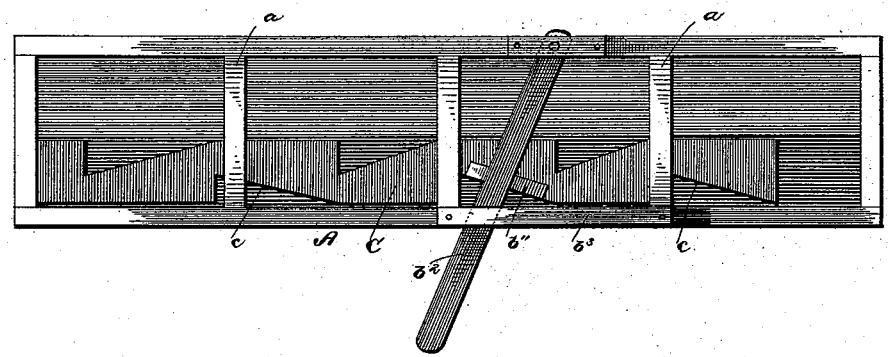
Figure 2:
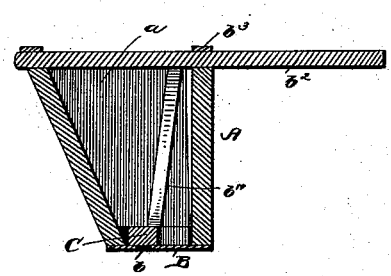
Figure 3:
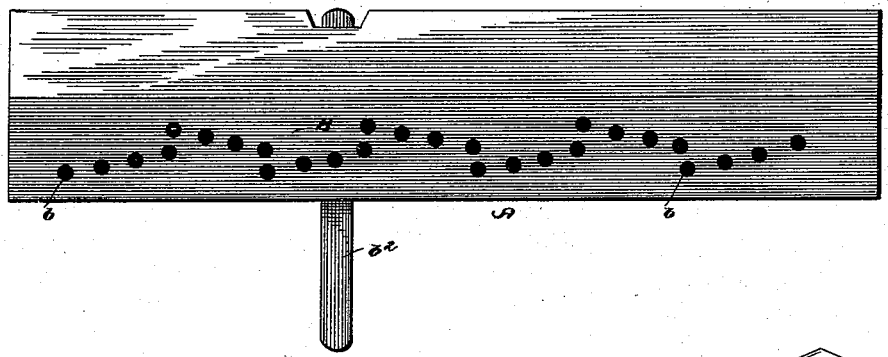
Figure 4:
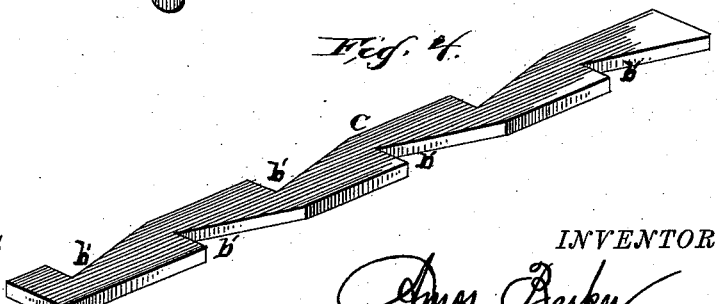

In the accompanying drawings, Figure 1 is a plan view of my invention. Fig. 2 is a cross-sectional view thereof. Fig. 3 is a bottom plan view; and Fig. 4 is a detail.

Referring to the drawings, A indicates a hopper of any desired length, and said hopper is provided with a series of partitions, $a$, extending to within a short distance of its bottom, as shown.

B is the bottom of the hopper secured to the longitudinal sides and end pieces of said hopper, and is provided throughout its length with a series of zigzag or tortuously-arranged openings or apertures, $b$, as shown.

C is the slide or cut-off, of thickness corresponding to the width of the bottom of the hopper, between the lower inner edges of the sides thereof. This slide or cut-off is composed of a series of oppositely-disposed step-like recesses, $b'$, on its longitudinal sides, as shown.

To the upper end of the upright post or arm $b''$ is loosely attached the central portion of a hand-lever, $b^2$, fulcrumed at its forward end in a groove in the upper edge of the front of the hopper and passed in under a keeper-plate, $b^3$, disposed over a groove in the rear wall of said hopper, as shown.

The formation of the slide or cut-off with oppositely-disposed step-like recesses, as described, corresponds with the described arrangement of the holes or openings $b$ in the bottom B, whereby, when said slide or cut-off is moved to the right by means of the lever C, the said holes or openings in the bottom are left open or uncovered, and when forced to the left by the same means said holes or openings are closed or covered by said slide or cut-off.

From what has been said it will be seen that by operating the slide or cut-off, through the agency of the lever $b^2$, the equal and even planting or distributing of the seed is readily effected, by reason of the described formation of the slide or cut-off and the arrangement of the holes or apertures in the bottom of the hopper, said holes or apertures being all opened or closed at the same time.

I claim as my invention—

The herein-described improvement in seed-planters, comprising the hopper having its bottom provided with a series of zigzag or tortuously-arranged holes or apertures, and the slide or cut-off having oppositely-disposed step-like recesses, substantially as shown and described.

In testimony whereof I affix my signature in presence of two witnesses.

AMOS BARKER.

Witnesses:
J. M. STEWART,
J. W. ARCHER.